United States Patent [19]

Booy et al.

[11] Patent Number: 5,462,757
[45] Date of Patent: Oct. 31, 1995

[54] METHOD FOR MANUFACTURING TARTSHELLS

[76] Inventors: Caroline Booy; Robert Booy, both of Box 40, Group 374, R.R. #3, Winnipeg, Manitoba, Canada, R3C 2E7

[21] Appl. No.: 249,628

[22] Filed: May 26, 1994

[51] Int. Cl.⁶ .............................. A21C 3/00; A21C 11/00; A21C 9/08; A21D 8/02
[52] U.S. Cl. .................. 426/486; 426/512; 426/514; 426/280; 426/391; 99/380
[58] Field of Search ..................... 426/496, 512, 426/514, 280, 391; 99/380

[56] References Cited

U.S. PATENT DOCUMENTS

| | | | |
|---|---|---|---|
| 1,467,351 | 7/1921 | Blunt | 426/280 |
| 3,696,734 | 10/1972 | Beasley et al. | 99/380 |
| 4,078,876 | 3/1978 | Yesulis | 425/458 |
| 4,371,327 | 2/1983 | Fievez | 425/218 |

OTHER PUBLICATIONS

Cunningham et al "The Fannie Farmer Cookbook" p. 612, (1979).

Primary Examiner—Donald E. Czaja
Assistant Examiner—Choon P. Koh
Attorney, Agent, or Firm—Adrian D. Battison; Murray E. Thrift

[57] ABSTRACT

A method of manufacturing tart shells uses a manually operated hinged die and press arrangement in which the die is shaped with a female receptacle for receiving a foil tart case and the press has a male portion for compressing dough into the tart case and squeezing the dough to form a continuous constant thickness layer across the inside of the tart case. To prevent adhesion of the male portion in the dough, a sheet of plastic film is placed over the tart shell and the dough ball when inserted into the case. The plastic film prevents adhesion of the dough to the male portion and the plastic film can be readily removed after the compression is complete.

4 Claims, 2 Drawing Sheets

5,462,757

METHOD FOR MANUFACTURING TARTSHELLS

BACKGROUND OF THE INVENTION

The present invention relates to a method for manufacturing tart shells and is particularly but not exclusively directed to the small scale manufacturing of such tart shells for home use or in small bakeries or restaurants.

Conventionally the home baker or small manufacturer has to press tart dough into the conventional tart case by initially rolling the dough into a flat sheet, cutting the dough into circular pieces and then placing the circular pieces into the tart case by hand. This process is very slow and the results are unfortunately not uniform since the thickness of the tart shell can vary leading to difficulties in further processing and leading to an inconsistent product.

It is also known in large commercial establishments to manufacture dough cases of this type using a large multi-piece molding system which requires heat applied to the upper part of the mold to ensure that the dough does not stick to the male parts of the mold which press the dough into the female tart cases. Such a heating system is of course entirely impractical in the small scale or on the home baker situation and accordingly up till now no method has been available to assist the small scale or home baker with the manufacturing of tart cases.

SUMMARY OF THE INVENTION

It is one object of the present invention, therefore, to provide an improved method of manufacturing tart shells.

According to one aspect of the invention there is provided a method of forming a tart shell comprising providing a mold bottom having a flat base and a frusto-conical wall diverging upwardly and outwardly from the base so that the base and frusto-conical wall define a recess, placing into the recess of the mold bottom a tart case, placing into the tart case a piece of dough to be formed into the tart shell, placing over the dough and across the recess of the mold bottom a sheet of non-stick plastics film, and pressing into the mold bottom a mold top having a flat base and a frusto-conical wall diverging upwardly and outwardly from the flat base thus defining a male portion for extending into the recess of the mold bottom, and shaping the recess and the male portion such that the dough is squeezed therebetween to form a layer inside the tart case of substantially constant thickness, removing the mold top from the mold bottom and removing the plastic film from an inside surface of the tart shell.

With this method, therefore, the tart case generally of foil is placed into a female die which can be manufactured of either wood or plastic. The dough is inserted into the foil case, covered with a small sheet of plastic film and the top press is pushed down into the die by manual actuation to squeeze the dough into the required shape within the foil case.

The device of the present invention is simpler to use than the commercial press in that it is entirely manual and does not require heat to release the dough from the top die.

This new idea overcomes the difficulties of previous methods in that an exact die is made of the various sizes of tart cases available. The mold bottom or die is arranged to be the same shape as the foil case and the top press is arranged as the inverted shape of the case but with a ⅛ inch reduction so that when pressed together the dough is squeezed into the ⅛ inch space to obtain a constant thickness throughout the interior of the foil case as a constant layer, This therefore provides uniform results each time the device is used. The thickness of the dough layer can of course be varied in accordance with requirements.

It is not therefore necessary to roll the dough into the flat sheet and to manually insert the cut pieces of rolled dough into the cases. Instead the dough is simply cut into balls or pieces of dough and generally a piece which is formed into a spherical ball of the order of 1 inch diameter is adequate for a 3 inch diameter tart case. The piece or ball is then placed into the tart shell with a piece of plastic film for example Saran Wrap or Cling film and the top press is pressed down into place.

The plastic film allows the device to operate without the dough being adhered to the top press. With the plastic film in place, the top press can be readily removed from the pressed tart shell since there is no adhesion to the plastic film. With the top press removed, the plastic film can very easily be pulled away from the pressed tart shell while the shell is being removed from the die.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
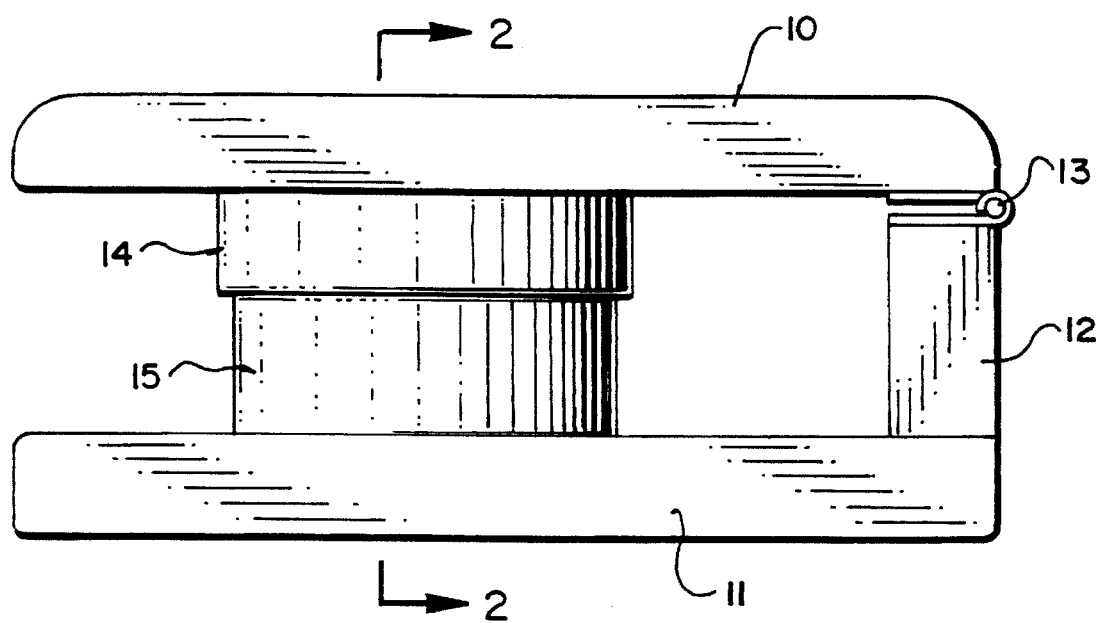
FIG. 1 is a side elevational view of the tart press using the method of the present invention.

The tool with which the present method is performed comprises a top plate 10 and a base plate 11. The base plate 12 includes at one end an upstanding end wall 12 with a hinge 13 positioned at the top of the upstanding wall 12 and at one end of the top plate 10 allowing pivotal movement of the top plate about a horizontal axis transverse to the top and base plates. The proper base plates are preferably manufactured from wood or may be manufactured by molding from plastics material and in one example the top plate may have a transverse width of the order 3 inches and a length of the order of 8 inches so that is easily manually movable about the hinge 13. The top plate 10 carries a male press 14 and the base plate 11 carries a female die 15. The mold parts 14 and 15 comprise a single mold structure mounted on the tool for manufacturing a single tart shell in each actuation of the device.

In an alternative arrangement a number of tart shells can be manufactured simultaneously by providing a plurality of such molds and generally this will be used in the type of tart shell which is relatively small.

The male press 14 includes a flat base 16 and a frusto-conical wall 17 diverging upwardly and outwardly from the flat base to an annular surface 18 which lies in a horizontal plane at the top of the male press portion.

Figure 2:
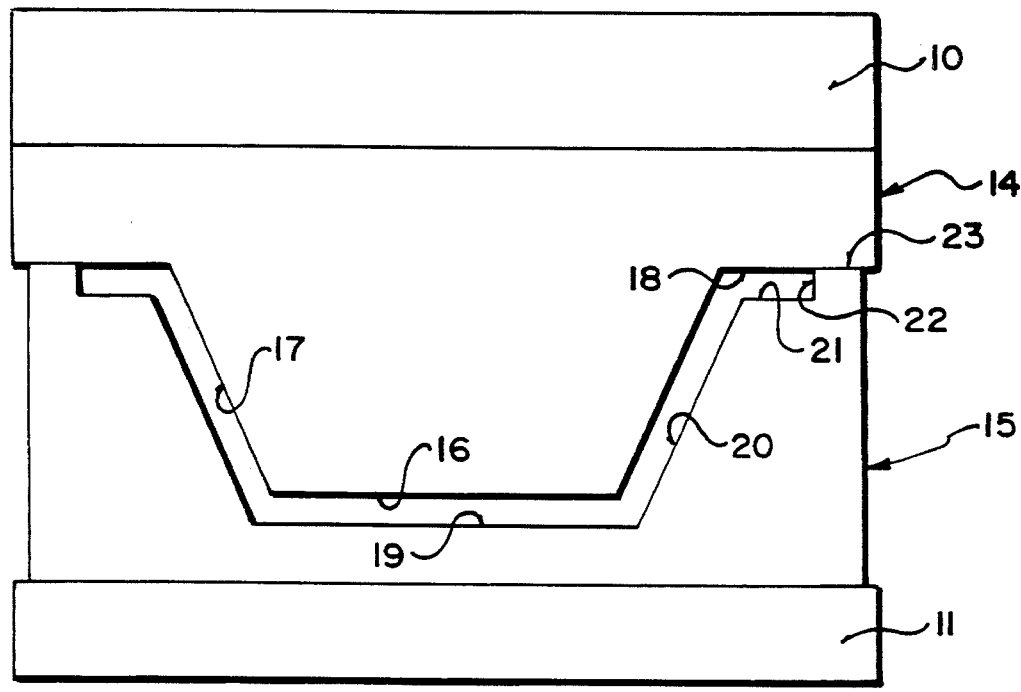
FIG. 2 is a cross sectional view along the lines 2—2 of FIG. 1.

The female die is similarly shaped including a flat base 19 and a frusto-conical wall 20 diverging upwardly and outwardly to an annular support surface 21 which is terminated at its outer edge by a vertical shoulder 22 extending upwardly to a top surface 23 which engages the surface 18 of the male mold portion in the closed position thereof shown in FIG. 2. There is a space between the base 16 and the base 19 and a similar space between the frusto-conical wall 17 and the frusto-conical wall 20 which is sufficient to receive the required thickness of the layer of dough for manufacturing the tart shell.

Figure 3:
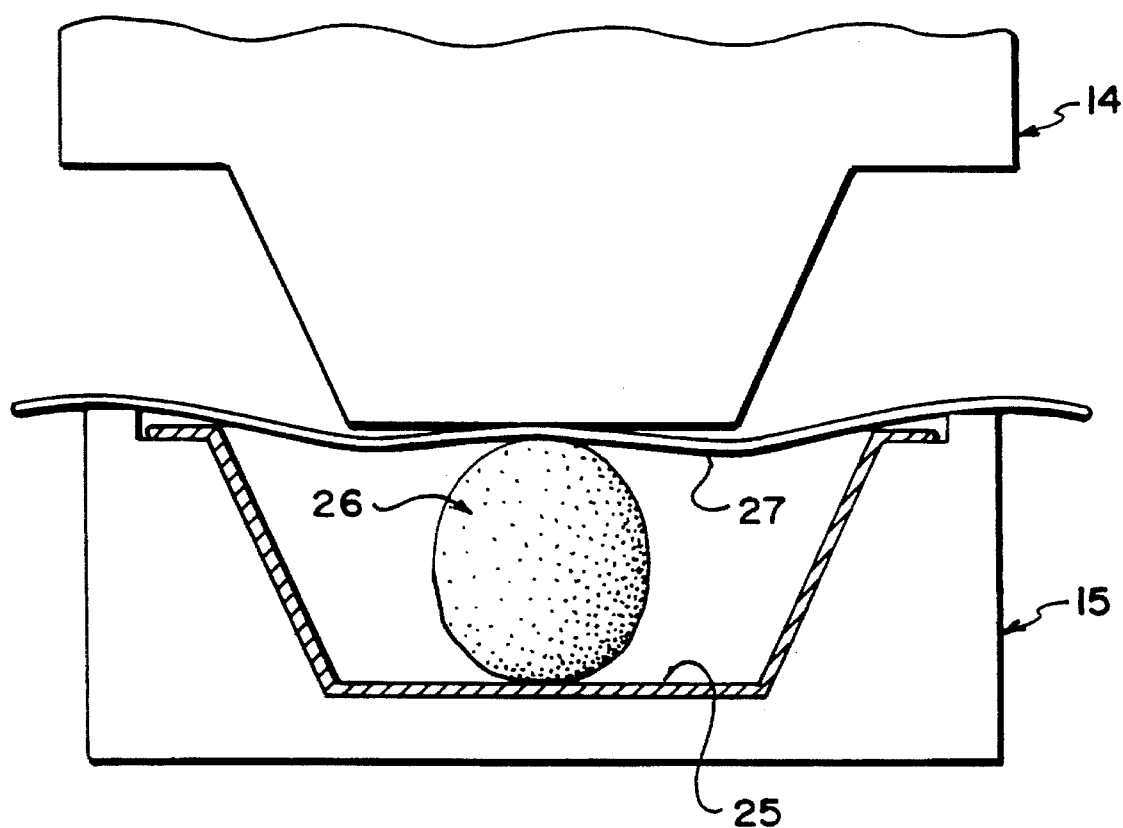
FIG. 3 is a cross sectional view similar to that of FIG. 2 showing a preliminary step in the method.

As shown in FIG. 3, a tart case 25 is placed on the female mold part and is shaped so that an outside surface of the tart case lies directly in contact with the inside surface of the recess of the female mold part. A ball 26 of the dough is then placed into the tart case and is covered with a sheet of plastic film 27 which is of sufficient dimension to cover the whole of the tart shell when the plastic sheet is deformed into the shape of the tart shell by the male mold part.

Figure 4:
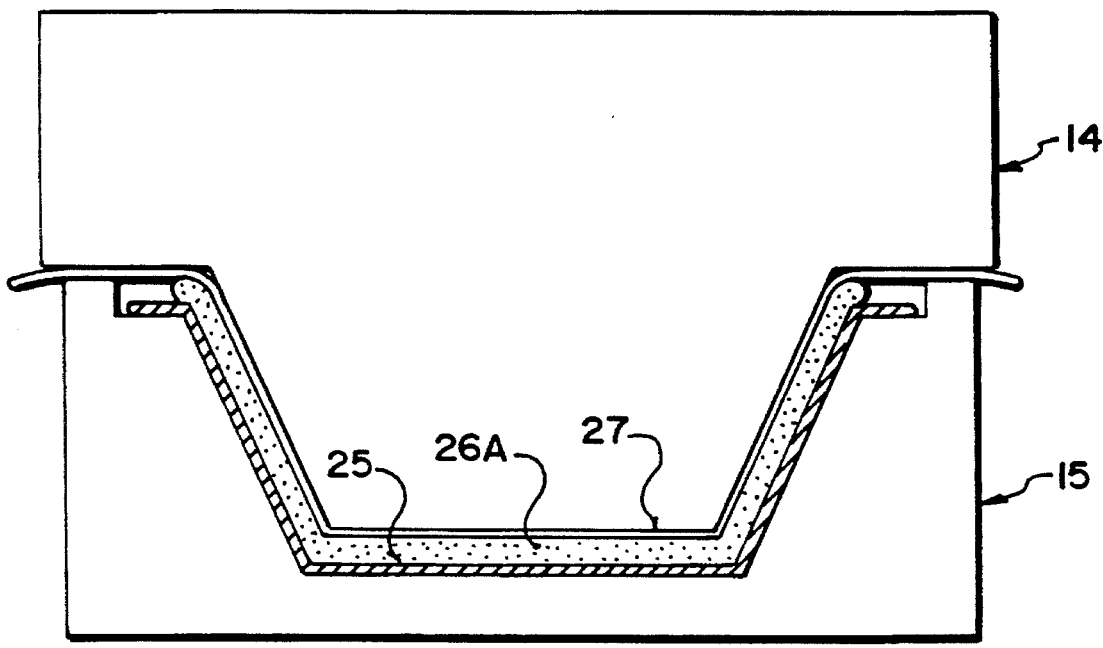
FIG. 4 is a similar cross sectional view of that of FIG. 2 showing the completed tart shell of the method of the present invention.

As shown in FIG. 4, after the male mold portion is inserted into the female receptacle, the plastic film is compressed onto the dough which is itself squeezed into the space between the male and female mold parts. The thickness of the film and the thickness of the foil tart case are very thin in comparison with the thickness of the dough when compressed so that substantially the whole of the space between the male and female mold part is filled with the dough.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method of forming a tart shell comprising providing a mold bottom having a flat base and a frusto-conical wall diverging upwardly and outwardly from the base so that the base and frusto-conical wall define a recess, placing into the recess of the mold bottom a tart case, placing onto the flat base of the tart case a piece of cold uncooked pastry dough in an initial shape to be formed into the tart shell, placing over the dough and across the recess of the mold bottom a sheet of non-stick plastics film, and pressing into the mold bottom a mold top having a flat base and a frusto-conical wall diverging upwardly and outwardly from the flat base thus defining a male portion for extending into the recess of the mold bottom, compressing the mold top into the mold bottom so as to deform the piece of dough from the initial shape and to squeeze the dough from the flat base onto the frusto-conical wall, shaping the recess and the male portion such that the dough therebetween defines a layer inside the tart case of substantially constant thickness, removing the mold top from the mold bottom and, prior to effecting any heating of the tart shell, removing the plastics film from an inside surface of the tart shell.

2. A method of forming a tart shell comprising providing a mold bottom having a flat base and a frusto-conical wall diverging upwardly and outwardly from the base so that the base and frusto-conical wall define a recess, placing into the recess of the mold bottom a tart case, placing onto the flat base of the tart case a piece of cold uncooked pastry dough in an initial shape to be formed into the tart shell, placing over the dough and across the recess of the mold bottom a sheet of non-stick plastics film, and pressing into the mold bottom a mold top having a flat base and a frusto-conical wall diverging upwardly and outwardly from the flat base thus defining a male portion for extending into the recess of the mold bottom, compressing the mold top into the mold bottom so as to deform the piece of dough from the initial shape and to squeeze the dough from the flat base onto the frusto-conical wall, shaping the recess and the male portion such that the dough therebetween defines a layer inside the tart case of substantially constant thickness, removing the mold top from the mold bottom and, prior to effecting any heating of the tart shell, removing the plastics film from an inside surface of the tart shell, the compressing of the mold top into the mold bottom including mounting the mold bottom on a base plate and mounting the mold top on a top plate, providing a hinge between the base plate and the top plate for pivotal movement of the mold top relative to the mold bottom and applying downward force on the top plate at a position spaced from the hinge to apply a leverage effect on the top plate relative to the bottom plate.

3. The method according to claim 2 including providing a single mold bottom and a single mold top on the base plate and top plate respectively.

4. The method according to claim 1 including providing on the mold bottom a horizontal support surface at a top edge of a frusto-conical wall thereof the horizontal support surface extending outwardly around the frusto-conical wall in an annular shape and including a vertical shoulder at an outer edge of the support surface and providing on the mold top a horizontal surface for lying across the support surface and spaced therefrom by the vertical shoulder.

\* \* \* \* \*